(12) United States Patent
James (10) Patent No.: US 8,951,392 B2
(45) Date of Patent: Feb. 10, 2015

(54) COMPACT EVAPORATOR FOR MODULAR PORTABLE SAGD PROCESS

(75) Inventor: Kenneth James, Calgary (CA)

(73) Assignee: 1nSite Technologies Ltd., Calgary, Alberta (CA)

(*) Notice: Subject to any disclaimer, the term of this patent is extended or adjusted under 35 U.S.C. 154(b) by 507 days.

(21) Appl. No.: 13/087,708

(22) Filed: Apr. 15, 2011

(65) Prior Publication Data

US 2012/0193213 A1 Aug. 2, 2012

Related U.S. Application Data

(60) Provisional application No. 61/436,723, filed on Jan. 27, 2011.

(51) Int. Cl.
*B01D 1/08* (2006.01)
*B01D 1/22* (2006.01)
(Continued)

(52) U.S. Cl.
CPC *B01D 1/065* (2013.01); *B01D 1/28* (2013.01); *B01D 1/30* (2013.01); *C02F 1/08* (2013.01); *C02F 1/041* (2013.01); *C02F 1/18* (2013.01); *C02F 2201/008* (2013.01);
(Continued)

(58) Field of Classification Search
USPC ........ 159/13.2, 24.1, 17.1, 27.1, 42, 43.1, 44, 159/49, 901, DIG. 2, DIG. 8, DIG. 40, 159/DIG. 41; 165/115, DIG. 135, DIG. 169; 202/83, 153–156, 172, 182, 197, 262, 202/264; 203/1, 3, 10, 20, 26, 40, 72, 78, 203/89, 98, DIG. 8; 210/774, 776, 805, 806
See application file for complete search history.

(56) References Cited

U.S. PATENT DOCUMENTS 1,617,082 A * 2/1927 Price .............................. 165/117
2,310,649 A * 2/1943 Peebles ........................ 159/27.1
(Continued)

FOREIGN PATENT DOCUMENTS

CA 2 547 503 A1 6/2005
CA 2 609 859 A1 5/2009
(Continued)

*Primary Examiner* — Virginia Manoharan
(74) *Attorney, Agent, or Firm* — Fay Sharpe LLP (57) ABSTRACT

A modular portable evaporator system for use in a Steam Assisted Gravity Drainage (SAGD) systems having an evaporator, with a sump including an oil skimming weir, a short tube vertical falling film heat exchanger including an outer shell containing short tubes provided for lower water circulation rate. The system further having external to the evaporator, a compressor for compressing evaporated steam from the tube side of the heat exchanger and routing to the shell side of the same exchanger, a distillate tank to collect hot distilled water, a recirculation pump to introduce liquids from the sump into the heat exchanger and an external suction drum protecting the compressor from liquid impurities. The evaporator system receives produced water from the SAGD process into the sump and provides cleaned hot water to a boiler.

15 Claims, 6 Drawing Sheets

(51) Int. Cl.
*B01D 1/28* (2006.01)
*B01D 3/02* (2006.01)
*B01D 3/28* (2006.01)
*C02F 1/08* (2006.01)
*C02F 1/18* (2006.01)
*B01D 1/06* (2006.01)
*B01D 1/30* (2006.01)
*C02F 1/04* (2006.01)

(52) U.S. Cl.
CPC ............ *Y10S 159/901* (2013.01); *Y10S 159/02* (2013.01); *Y10S 165/135* (2013.01); *Y10S 165/169* (2013.01); *Y10S 203/08* (2013.01)
USPC .......... 203/10; 159/13.2; 159/24.1; 159/27.1; 159/42; 159/44; 159/49; 159/901; 159/DIG. 2; 165/115; 165/DIG. 135; 165/DIG. 169; 202/83; 202/154; 202/156; 202/172; 202/182; 202/197; 203/1; 203/3; 203/26; 203/40; 203/72; 203/78; 203/89; 203/98; 203/DIG. 8; 210/774; 210/776; 210/805; 210/806

(56) References Cited

U.S. PATENT DOCUMENTS

| | | | | |
|---|---|---|---|---|
| 3,155,600 | A * | 11/1964 | Williamson | 203/11 |
| 4,002,538 | A * | 1/1977 | Pottharst, Jr. | 203/10 |
| 4,428,328 | A | 1/1984 | Ratliff | |
| 4,683,025 | A * | 7/1987 | Flores | 159/2.1 |
| 4,880,533 | A * | 11/1989 | Hondulas | 210/104 |
| 4,924,936 | A * | 5/1990 | McKown | 165/47 |
| 5,221,439 | A * | 6/1993 | Li et al. | 202/175 |
| 5,906,714 | A * | 5/1999 | Gramkow et al. | 203/2 |
| 6,019,818 | A | 2/2000 | Knapp | |
| 6,199,834 | B1 | 3/2001 | Popov et al. | |
| 6,234,760 | B1 | 5/2001 | Popov et al. | |
| 6,244,098 | B1 | 6/2001 | Chen et al. | |
| 6,315,000 | B1 | 11/2001 | Goodyear | |
| 6,418,957 | B1 | 7/2002 | Goodyear | |
| 6,536,523 | B1 | 3/2003 | Kresnyak et al. | |
| 6,938,583 | B2 | 9/2005 | Wood | |
| 7,306,057 | B2 * | 12/2007 | Strong et al. | 175/66 |
| 7,326,285 | B2 | 2/2008 | Chowdhury | |
| 7,591,309 | B2 | 9/2009 | Minnich et al. | |
| 7,647,976 | B2 | 1/2010 | Tsilevich | |
| 7,681,643 | B2 | 3/2010 | Heins | |
| 2002/0043289 | A1 | 4/2002 | Goodyear | |
| 2002/0088703 | A1* | 7/2002 | Walker | 203/10 |
| 2002/0184784 | A1* | 12/2002 | Strzala | 34/60 |
| 2007/0007172 | A1* | 1/2007 | Strack et al. | 208/106 |
| 2007/0051513 | A1 | 3/2007 | Heins | |
| 2008/0110630 | A1 | 5/2008 | Minnich et al. | |
| 2009/0020456 | A1 | 1/2009 | Tsangaris et al. | |
| 2009/0084707 | A1 | 4/2009 | Gil | |
| 2010/0058771 | A1 | 3/2010 | Gil et al. | |
| 2011/0036308 | A1 | 2/2011 | Betzer-Zilevitch | |
| 2011/0061816 | A1* | 3/2011 | Duesel et al. | 159/4.01 |
| 2011/0089013 | A1 | 4/2011 | Sakurai et al. | |
| 2012/0000642 | A1 | 1/2012 | Betzer Tsilevich | |

FOREIGN PATENT DOCUMENTS

| | | |
|---|---|---|
| CA | 2 610 052 A1 | 5/2009 |
| WO | WO 2005/054746 A2 | 6/2005 |
| WO | WO2005054746 A2 | 6/2005 |
| WO | WO 2008/098242 A2 | 8/2008 |

* cited by examiner

COMPACT EVAPORATOR FOR MODULAR PORTABLE SAGD PROCESS

FIELD OF THE INVENTION

A compact evaporator system for production of high quality boiler feed water as part of a Steam Assisted Gravity Drainage (SAGD) process facility.

BACKGROUND OF THE INVENTION

In the SAGD industry, the produced water recovered from the SAGD production fluids and make-up water added to account for losses must be treated to remove various contaminants to meet boiler feed water specification. The contaminants include water hardness, silica, minerals, and residual oil/bitumen. If the water hardness, silica, and minerals are not removed from the water prior to steam generation, they will precipitate in the boiler causing reduced heat transfer, lower capacities, higher boiler tube temperatures, and ultimately failure of the boiler or extended boiler outages for cleaning and repairs. If the residual oil/bitumen is not removed from the water prior to steam generation, there will be foaming and fouling issues in the boiler drum and tubes, again leading to process upsets and shutdowns.

The majority of SAGD production facilities utilize hot or warm lime softening systems combined with Weak Acid Cation (WAC) ion exchange systems to treat produced and make-up water. However, this process does not produce a high quality boiler feed water and necessitates the use of Once Through Steam Generators (OTSG) which only partially boil the feed water (75-80%) to prevent scale deposition by maintaining solids in solution in the un-boiled water. This leads to energy inefficiency and excessive water disposal rates. OTSGs are custom built for the oil sands industry making them very costly compared to conventional boilers.

Recently some SAGD operators have adopted falling film evaporators that produce a high quality distilled water for boiler feed water, which has made it possible to shift to more conventional drum boilers. The combination of falling film evaporators and drum boilers results in much higher water recycle rates in a SAGD facility, which is becoming an increasingly critical environmental consideration.

Figure 1:
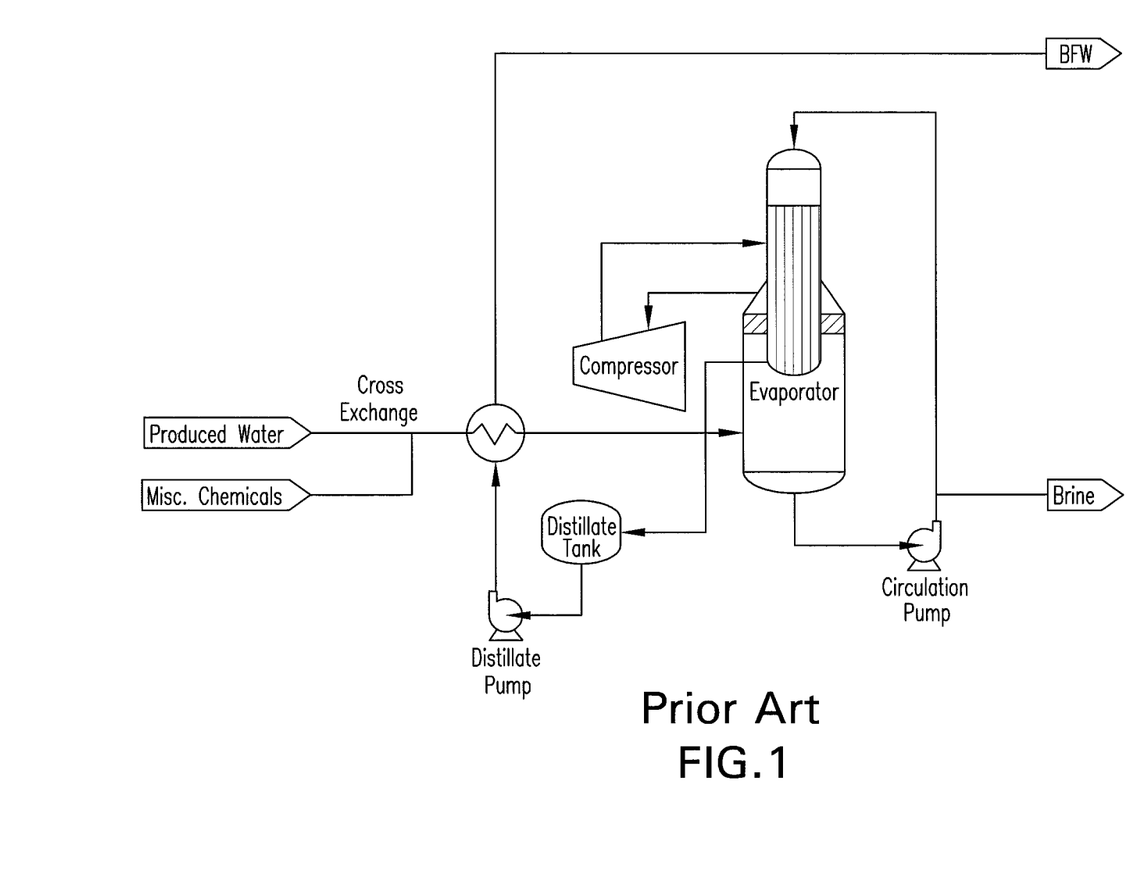
FIG. 1 is a schematic illustration of the process flow in the evaporator in prior art.

The overall process in a single sump evaporator is simplified as follows. The feed water flows to the evaporator sump and is re-circulated through the tube side of a falling film heat exchanger. A small portion of the water will evaporate. A compressor increases the pressure and temperature of the vapour and sends it to the shell side of the falling film heat exchanger. Heat exchanged between the vapour and water acts to condense the vapour on the shell side to distilled water and evaporates a small portion of the water on the tube side. The distilled water is stored in a distillate tank and then pumped to the downstream consumers. FIG. 1 (PRIOR ART) illustrates a typical MVC evaporator configuration.

Evaporators have been used extensively in the mining and pulp and paper industries as means of concentrating solids into a brine or recovering water from waste streams. In these applications, the solid contaminants are generally soluble in water. However, the SAGD process can introduce contaminants that are not normally present or in different concentrations as a result of injecting steam into an underground reservoir that is recovered as hot water with the production fluids. Oil and water soluble solids present in the reservoir may cause variances in produced water quality at any given time, which can lead to operating problems in standard evaporator designs.

Operating companies are finding that there are many shortcomings with the current industry practice and evaporator system designs in SAGD facilities. The typical problems in evaporators in SAGD facilities include:
a) Hardness scaling
b) Silica deposit
c) Oil accumulation and foaming
d) Poor internal mist elimination performance
e) Compressor vibration and scaling caused by foaming
f) Large size preventing its use in mobile systems Hardness (mineral ions such as $Ca^{2+}$ or $Mg^{2+}$) scaling and silica deposits are controlled by limiting the concentration, increasing the pH of the water, adding scale inhibitors such as calcium sulphate seed crystals as described for example in U.S. Pat. No. 7,681,643; or controlling the water recirculation through the falling film heat exchanger.

There is some attempt in conventional designs to deal with oil accumulation in the evaporator sump via a skim draw at some specific level in the sump. This scheme can only be effective if the sump level is precisely controlled at a level just above the skim draw nozzle. If the level is too high above the draw point, oil will accumulate and if falls below the draw nozzle, no liquid flow will be drawn off and again oil will accumulate. The oil accumulated in the evaporator sump causes excessive foaming. Antifoam chemicals are added to the feed water but the addition is not adequate to deal with excessive foam caused by oil accumulation in the sump.

Evaporator internals consist of a mist eliminating pad between the evaporator sump and the compressor inlet to remove fine water droplets, which is water washed with product distilled water on an intermittent basis. Without the water washing, salt from evaporated brine accumulates on the surface of the mist eliminating pad resulting in excessive pressure drop at the compressor suction. A stream of distilled water is sprayed on the top and the bottom of the mist eliminating pad to dissolve deposited scale and the contaminated water returned to the evaporator sump.

The present invention has made an improvement in handling accumulated oil in the evaporator, in prior filed U.S. provisional patent application 61/376,301 entitled A Water Evaporator for a Steam Assisted Gravity Drainage (SAGD) Central Processing Facility (CPF) System the contents of which is hereby incorporated by reference herein as if it was fully included herein with. This patent application also claims process controllers that will improve the handling of scaling and silica issues.

The implementation of existing technology involves a vertical exchanger bundle mounted on top of an evaporator sump. The sump provides both liquid inventory for the brine recirculation pumps and vapour space for liquid-vapour disengagement. The mist eliminators are typically installed in the vapour space in the annulus area around the falling film heat exchanger bundle, above which is outlet piping to the compressor suction. For example, DEMISTER® pads (DEMISTER® is a Registered trademark of Koch-Glitsch, LP) may be used as a specific mist eliminating pad. As a result, the evaporator is very tall relative to other SAGD equipment and has a vessel diameter which is significantly larger than the falling film exchanger. These dimensional features restrict the equipment capacity that can be easily modularized and transported. The high labour costs and low productivity typically associated with SAGD operations have driven owners to seek modular construction techniques to minimize site construction. This has created a need for a new design of evaporator for use in the modular SAGD technology/market development addressing all the above mentioned deficiencies.

There are also some operational and safety opportunities for adapting the old technology to the relatively new SAGD application. These opportunities include reducing the entrainment, reducing the foaming and scaling, improving the oil skimming, and reducing the maintenance and unexpected shutdowns.

Further and other aspects and objectives of the invention will become apparent to one skilled in the art from a review of the detailed description of the preferred embodiments of the invention illustrated and claimed herein.

SUMMARY OF THE INVENTION

According to a primary aspect of the invention there is provided an evaporator system which is specifically designed for oil sands service and is well suited to be modularized and portable for use in one embodiment in Steam Assisted Gravity Drainage (SAGD) systems (or in any other system requiring water treatment).

First Embodiment

Single Exchanger Configuration

This first embodiment of the system having:
A compact evaporator system for Steam Assisted Gravity Drainage (SAGD) systems comprising:
  a) an evaporator containing:
    i. a sump including an oil skimming weir,
    ii. a vertical falling film heat exchanger including tubes with shorter length and larger diameter then convention, to reduce the vaporization rate per pass and thereby reducing the potential for scale build-up
  b) said compact evaporator system further comprising:
    i. a compressor injecting steam into the heat exchanger,
    ii. a distillate tank to collect hot distilled water from the heat exchanger and
    iii. a recirculation pump to introduce the content of the sump into the heat exchanger; During operation, the evaporator system receives produced water from the process and make-up water into the sump and produces cleaned hot water for use in the boiler.

Preferably the system further having an external knockout drum and mist eliminator installed before the compressor to protect the compressor from liquid contaminations such as water drops or oil drops. In this system, the brine containing accumulated oil and dissolved solid impurities is being skimmed by the weir in the sump and removed from the evaporator system for disposal or feed to another purification process. Preferably the silica level in the system is controlled by means known in the art such as by pH adjustment or by addition of chemical solvents. Still preferably the liquid hardness in the system is controlled by the brine blowdown rate.

Second Embodiment

Parallel Dual Exchanger Configuration

A second embodiment of the invention there is provided a compact evaporator system for preferable use in SAGD systems. The compact evaporator system having:
A compact evaporator system for use in SAGD systems comprising:
  a) two vertical heat exchangers including tubes with shorter length and larger diameter then convention each equipped with a sump comprising an oil skimming weir;
  b) a compressor circulating steam from each evaporator sump into both heat exchangers,
  c) a compressor suction drum protecting the compressor from entrained liquid contaminations,
  d) a distillate tank collecting hot distilled water,
  e) a recirculation pump circulating brine from the sumps of the evaporators to the heat exchangers of the compact evaporators.

According to this second configuration of the invention there is provided a method for producing high quality boiler feed water by using a compact evaporator system having at least two vertical heat exchangers with short tubes, each equipped with a sump comprising an oil skimming weir.

During operation, the evaporator system receives produced water from the process into the sumps of two falling film evaporators and produces a clean hot water suitable as feed to a conventional steam boiler.

Third Embodiment

Dual Exchanger High and Low Concentration Configuration

According to a third embodiment of the invention there is provided a compact evaporator system preferably for SAGD systems having:
  a) A first heat exchanger having shorter and wider tube than convention for reduced vaporization rate per tube pass, having a sump including an oil skimming weir and a recirculation pump recycling brine from the sump into the first heat exchanger;
  b) A second heat exchanger having shorter and wider tube than convention for reduced vaporization rate per tube pass, having a sump including an oil skimming weir and a recirculation pump recycling brine from the sump into the second heat exchanger;
  c) a compressor injecting steam into the first and second heat exchangers, a knock out drum protecting the compressor from liquid contaminations and a distillate tank collecting hot distilled water.

During operation, the evaporator system receives produced water from the process into the sump of the first evaporator, and produces cleaned hot water for feed to the boiler. This way, the sump of the first heat exchanger having a lower concentration of impurities and the sump of the second heat exchanger having a higher concentration of impurities, with the blowdown from the first sump being fed to the sump of the second heat exchanger.

Preferably the contaminants skimmed from the first sump are transferred into the sump of the second heat exchanger, therefore keeping the impurities' concentration in the first heat exchanger lower than the impurities' concentration in the second heat exchanger, to reduce the fouling in the low concentration heat exchanger and reduce the boiling temperature of the brine in the first heat exchanger and reducing the total power required for the evaporator compressor.

Preferably the variants of the compact evaporator systems described above are adapted in size to fit on a module that can be hauled by truck and trailer for transportation to a remote operating location.

Still preferably, the compact evaporator system described above being a part of a modular transportable SAGD system capable of being assembled, disassembled and reassembled in remote locations.

According to another aspect of the invention there is provided a method for purification of water using a compact evaporator system of claim 1, 6 or 8 comprising the steps of:

a) Introduction of produced water and make-up water into a sump of the compact evaporator system,
b) Collecting the residual water from the falling film heat exchanger into the sump,
c) Pumping the liquid from the sump of the evaporator into the top of the tube side of the falling film heat exchanger,
d) Collecting steam created in the evaporator sump on the tube side of the falling film heat exchanger and routing this steam into the compressor suction drum and as necessary a mist eliminator to collect all liquid contaminations into the sump,
e) Compressing the steam from the compressor suction drum and routing this higher temperature and pressure steam to the shell side of the evaporator falling film heat exchanger,
f) Collecting the condensed steam from the shell side of the falling film heat exchanger into the distillate tank,
g) Skimming the top layer of the brine comprising oil and other impurities via the weir positioned in the evaporator sump,
h) Transfer of the skimmed brine to brine storage tank for offsite disposal or further processing,
i) Using the distilled water tank to feed water to the boiler or to recycle back to the evaporator sump.

DETAILED DESCRIPTION OF THE PREFERRED EMBODIMENTS

Key Features
The key features include:
Using a compact modular evaporator design for small facilities, and suitable for larger facilities.
For smaller facilities, capable of being transported and potentially relocated by truck.
Higher capacity for a given module size constraint.
Ability to increase the diameter of the shells and shorten the tube length for a given capacity. The resulting higher water circulation rate per tube reduces the potential of silica and hardness precipitation.
Using a highly functional oil skimmer design to eliminate oil build-up and reduce the number and severity of foaming incidents.
Circulating saline water at a higher rate through shorter tubes.
Utilizing a standard compressor knock-out drum to prevent contaminated water carryover entering the compressor (standard design and use for protecting large and small compressors from liquid carryover). This also minimizes the distilled water wash on a mist eliminator pad and hence increases the net production of distillate.
Enlarging the distillate tank.
Constructing the unit of more standard equipment types.

Benefits

A compact modular design provides a great benefit for small SAGD facilities. The produced water treating facilities (hot or warm lime softeners, evaporators) are the largest pieces of equipment in a SAGD facility. A compact modular evaporator is a critical feature required to facilitate the concept of portable facilities (SAGD). It can simply be disassembled and trucked to a new location with the rest of plant. The relocation will be significantly faster and the cost will be substantially less than what is expected with conventional evaporators.

The key benefits of the current design are:
Use of a shorter exchange bundle than typical designs which contributes to an overall lower height for the unit or a higher capacity for a given module size.
Effective oil and hydrocarbon skimming to reduce foaming incidents and reduce the potential for carryover into the vapour compressor.
The use of an external knockout drum to effectively remove entrained droplets to protect the compressor from liquid carryover.
Use of a relatively larger distillate tank to smooth transitions in evaporator and boiler rates which allows heat in the system to be conserved.
The design overall is more easily modularized than typical designs.

General Description-Single Exchanger Configuration

Figure 2:
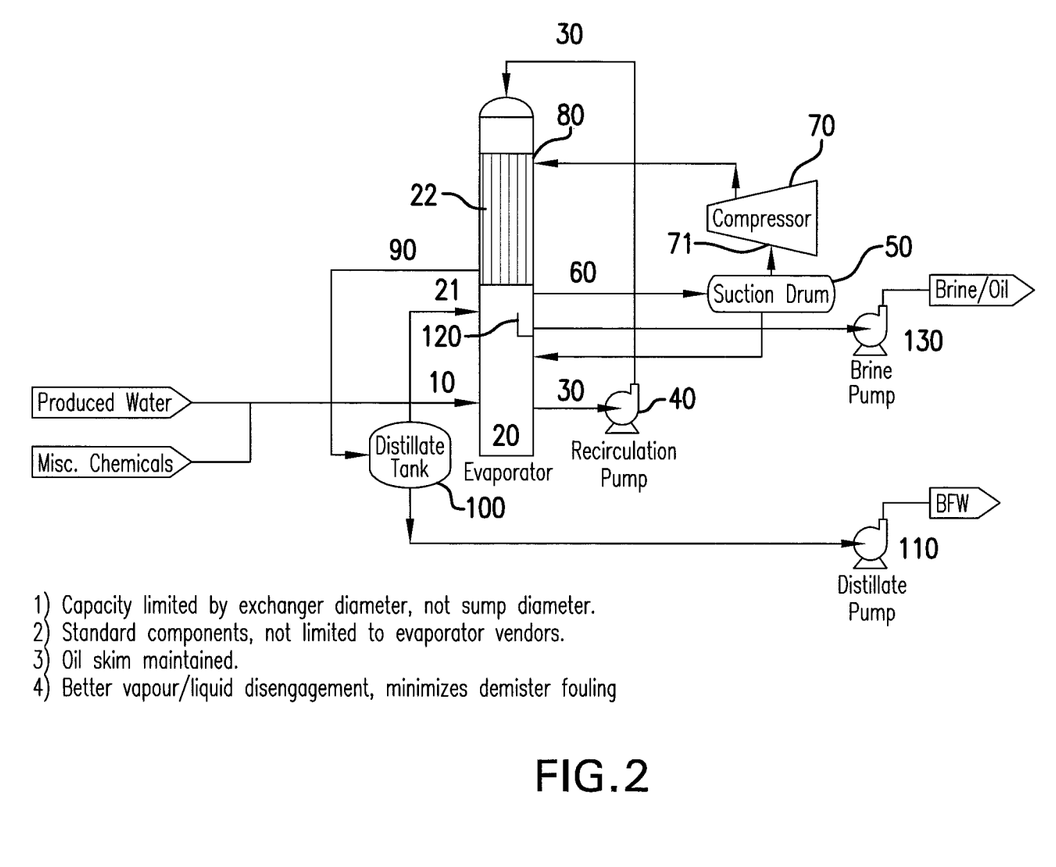
FIG. 2 is a schematic process flow diagram of the first embodiment of the current invention.

A preferred solution is to use a shorter heat exchanger, a smaller evaporator vessel, an external mist eliminating vessel, an effective oil skimmer and a bigger flash drum. The distilled water will be obtained with a smaller modularized and portable evaporator as seen in FIG. 2.

The feed water 10, consisting of produced water miscellaneous chemicals and make-up water, flows to the sump of the Evaporator 20. Brine 30 is re-circulated from the Evaporator sump by the Recirculation Pumps 40 through the tube side of a falling film Evaporator. The vaporization rate per tube pass due to the shorter tubes shorter relative to typical falling film evaporators in SAGD water treatment service, which will reduce the likelihood of scaling on the tube surface. A small portion of the water will evaporate in the tubes.

In the proposed design, an external Compressor Suction Drum 50 is used to remove any entrained water droplets 60 in the steam drawn from the evaporator sumps before the vapours enter the Compressor 70. This suction drum is a standard suction drum common to compressors. This design replaces the current combined falling film evaporator with an integrated large diameter sump acting as the compression suction drum. As mentioned above, in order to eliminate the contamination of the distillate, the prior art design employs a mist eliminator with a distillate water wash, with the mist eliminator prone to fouling and the distillate wash reducing the net production of distillate. In the present invention design, the compressor suction drum can be designed without a mist eliminator and still achieve the same removal of contaminants. If a mist eliminator is employed to reduce the size of the vessel, the mist eliminator would be located at the vapour draw from the vessel located as far horizontally from the vapour with mist inlet(s) to the vessel. This design will reduce the size of the required mist eliminator to achieve the required vapour/liquid separation.

With the compressor suction drum 50 upstream of the compressor inlet 71, the amount of liquid carry-over to the compressor, which will contaminate the distillate, will be reduced (without the need for mist eliminating pads and mist eliminating pads washing). Therefore, the achieved quality of the distillate will be improved or the capacity of distillate produced will be increased.

The Evaporator Compressor 70 increases the pressure and temperature of the steam produced from the circulating brine and sends it to the shell side 80 of the falling film evaporator exchanger 22. Heat exchanged between the vapour and water acts to condense the steam on the shell side 80 into distilled water and evaporates a similar volume of water from the brine being circulated on the tube side of the falling film heat exchanger 20. The distillate drains to the Distillate Tank where any vapour flashes and is returned to the evaporator sump 21. Distillate is pumped 110 to the downstream consumers.

The circulating water on the tube side of the falling film heat exchanger becomes concentrated in dissolved solids as water is distilled off in the form of steam and is thus referred to as brine. The brine falls from the tubes into the Evaporator Sump. This vessel contains a weir 120. Brine and accumulated oil or hydrocarbons, which could otherwise accumulate and cause foaming and fouling, overflow the weir and are removed by the brine pumps 130. Brine can also be removed at the discharge of the Brine Recirculation Pumps 40 if necessary on an intermittent basis.

One of the unique problems associated with SAGD evaporators is the high level of silica and hardness in the feed water resulting from the steaming of bitumen from oil sands, and the resulting tendency for the silica and other dissolved solids to precipitate and foul the heat transfer surface in the evaporator. In one embodiment, the present invention evaporator design will use an integrated pH control and cycle controller to maintain silica in solution to prevent fouling, which is included in a separate patent application 61/376,301 filed Aug. 24, 2010.

General Description—Parallel Dual Exchanger Design

Figure 3:
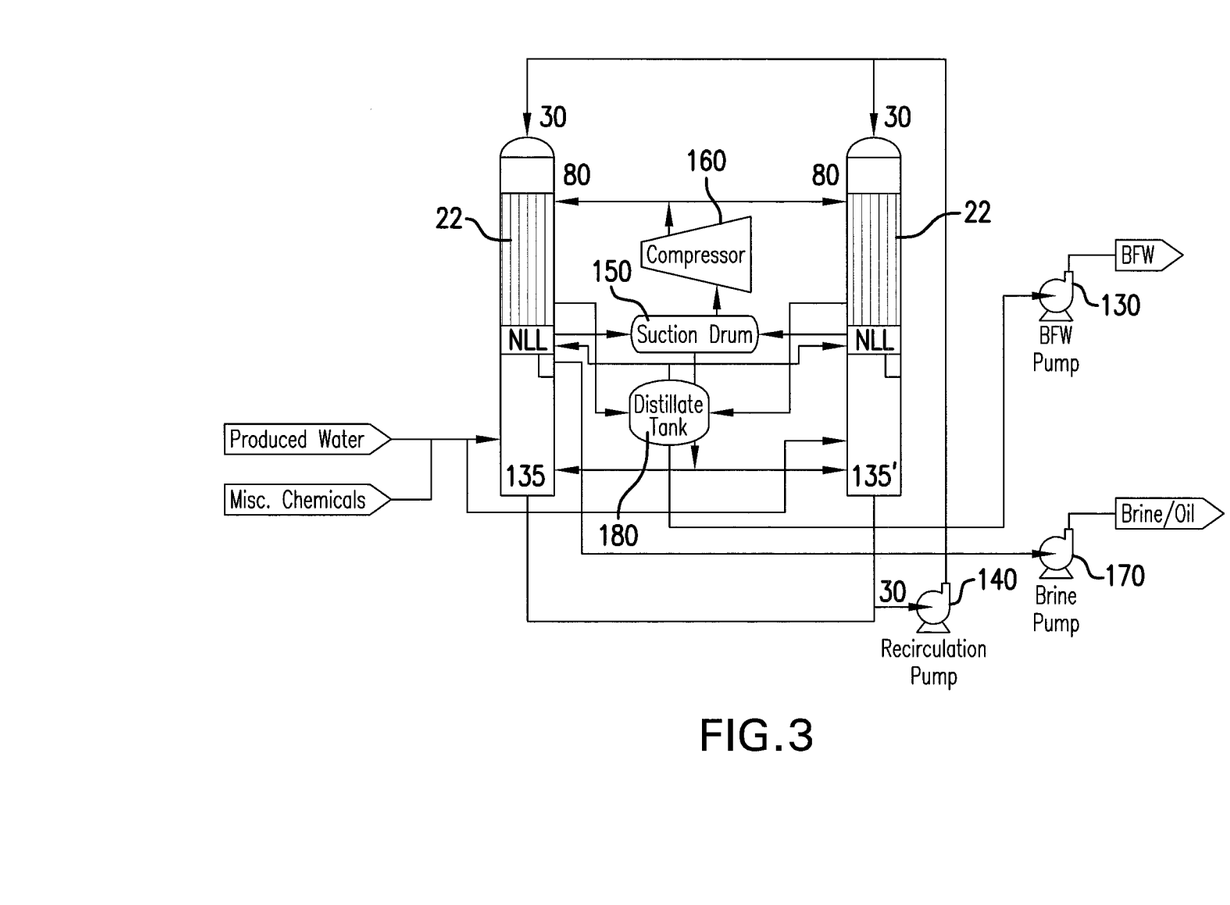
FIG. 3 is a schematic process flow diagram of the second embodiment of the current invention providing a combination of two evaporators.

The above design can be modified to incorporate two falling film evaporators 135, 135' coupled to a common brine circulation pump 140, a common compressor suction drum 150 and compressor 160, a common brine disposal pump 170 and a common distillate tank 180 (see FIG. 3). This option increases the overall capacity of the single modular evaporator system and provides two separate falling film heat exchangers 135, 135', each of which can be isolated from the system for maintenance while the other exchanger remains in service.

This design is very similar to the single exchanger design other than the two exchangers. All feeds and products are split between the two exchangers. From an operating perspective, this configuration allows the facility to operate at full rates for a short period of time by balancing with boiler feed water inventory or at reduced rates for an extended period of time when an exchanger is down for cleaning. Normally, the primary reason for an evaporator outage is to clean the exchanger which requires an outage of approximately 12-24 hours.

In the event that one of the two exchangers is taken off line for cleaning, the system capacity will be greater than fifty percent since the compressor will develop more pressure and temperature at the lower rates and thus increase the temperature differential between the tube side and shell side of the falling film exchanger.

The brine circulation rate will increase and vaporization rate will increase in the remaining on-line exchanger. For a clean exchanger, this actual rate will be closer to 75%. For a dirty exchanger (assume cleaning takes place when combined distillate rate is 80% of design), then the actual rate will be approximately 60% of design.

General Description—Dual Exchanger High and Low Concentration Design

Figure 4:
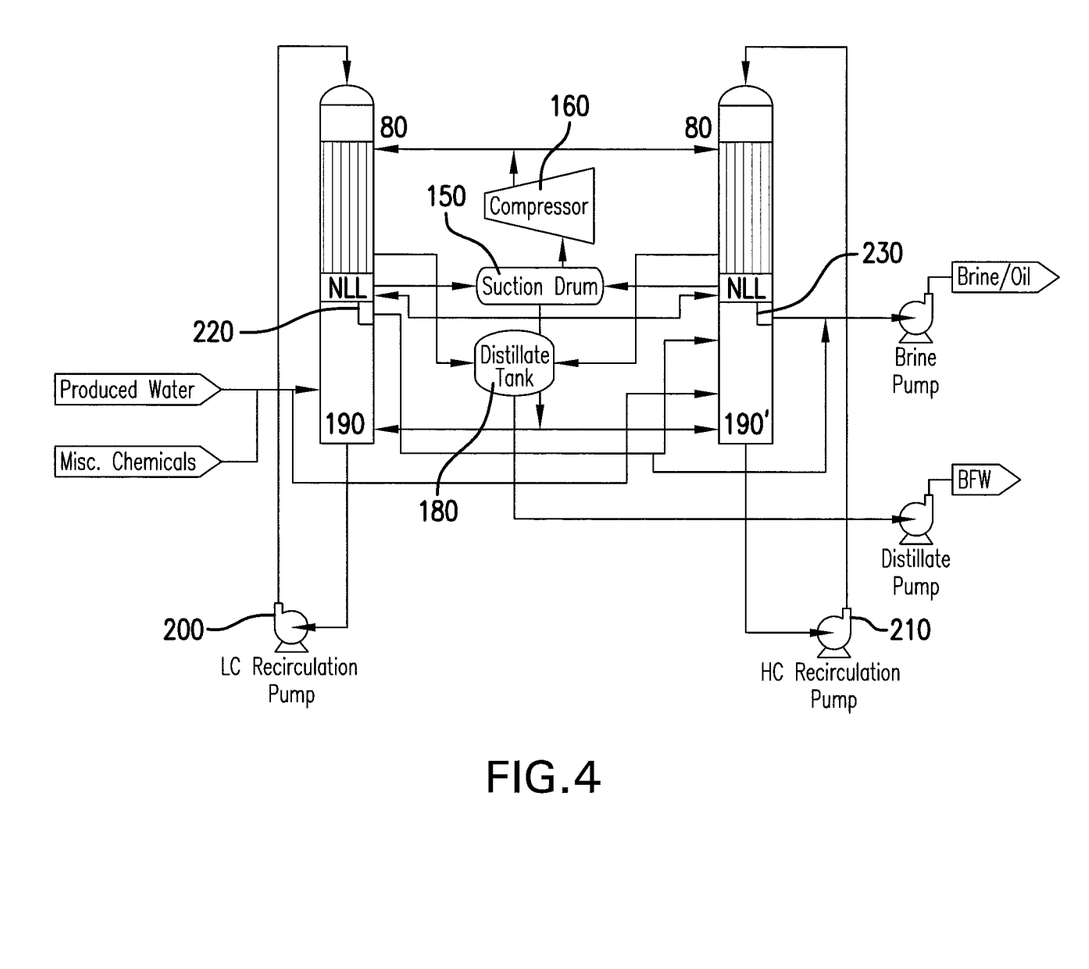
FIG. 4 is a schematic process flow diagram of the third embodiment of the invention provided with dual evaporator with dual concentration design.

Yet another configuration of the dual exchanger design is to operate at different concentrations in the each of the falling film heat exchangers 190, 190' (FIG. 4). This configuration can be used to reduce either the compressor horsepower requirement for similar sized evaporator exchangers or increase system capacity for the same compressor horsepower. However, this system does require independent brine circulation systems.

In this case the inlet water is fed to the low concentration exchanger 190. The lower concentration in the first evaporator reduces the boiling point of the brine and thus increases the differential temperature between the brine boiling and the vapour condensing in the exchanger for a given compressor flow and pressure. This feature can be used to either increases the capacity of the exchanger for a given compressor power or decreases the compressor power for a given exchanger capacity. In order to keep the concentrations different between the two exchangers, each exchanger requires its own recirculation pump 200, 210. The brine from the low concentration exchanger overflows a weir 220 (to ensure any oil collected is also transferred to the high concentration exchanger) and is routed to the sump of the high concentration exchanger 190'. The sump of the high concentration evaporator is equipped with a similar skimming weir 230 and the brine and any accumulated oil overflows the weir and is routed to the brine disposal tank.

The relative size of the two exchangers can be varied, with the minimum compressor horsepower reached at roughly a 70:30 exchanger size ratio between the low and high concentration evaporators.

With this evaporator configuration, the low concentration exchanger 190 is less likely to foul, given the low brine concentrations and the removal of all oil. The piping can then be arranged to allow the cleaning of the high concentration exchanger 190' while keeping the low concentration exchanger on-line. Similar to the dual exchanger design, distillate production will be greater than the nominal 70% of the design capacity because of the increase liquid and vapour flow to the exchanger. It is estimated that the system capacity will be approximately 85% of original design.

Solution Details

The present invention design employs shorter heat exchanger tubes and reduces the vaporization rate per tube pass, which reduces the fouling rate the exchanger tube surfaces. The shorter tubes also reduce the overall height of the unit. This dimensional flexibility allows greater capacities to fit within specific module dimensions.

The effective oil skimmer design, using a weir in the Evaporator Sump, eliminates oil accumulation and excessive foaming. This will dramatically reduce the probability of foam overflowing or being entrained into the Evaporator Compressor where it could cause vibrations, scaling and eventually damage to the compressor. As a result, the present invention design will reduce the number of unexpected shutdowns and the inherent risk of the design will decrease.

The use of an external compressor suction drum is more effective than an internal mist eliminator on evaporators where the compressor suction drum is integrated in the evaporator sump. The compressor suction drum can be fitted with a mist eliminating pad to ensure contaminants do not carry over to the compressor inlet and potential foul the compressor rotor, shell side exchanger surfaces or the distillate quality. In addition, the design will reduce or eliminate the need to recycle distilled water to washing vessel internals.

The Distillate Tank provides a larger holdup/surge time for down stream controllers than in typical designs. As a result, the distilled water flow can be controlled smoothly. This means that the distilled water can be directly pumped to the downstream consumer (the boiler). Moreover, the heat in the water can be conserved. If there is a decrease in the boiler rate, there is more capacity to temporarily hold up distillate in the Distillate Tank and adjust the evaporator throughput rather than diverting produced distillate to a storage tank while the Evaporator is adjusted. This will increase the overall efficiency of the system.

Figure 5:
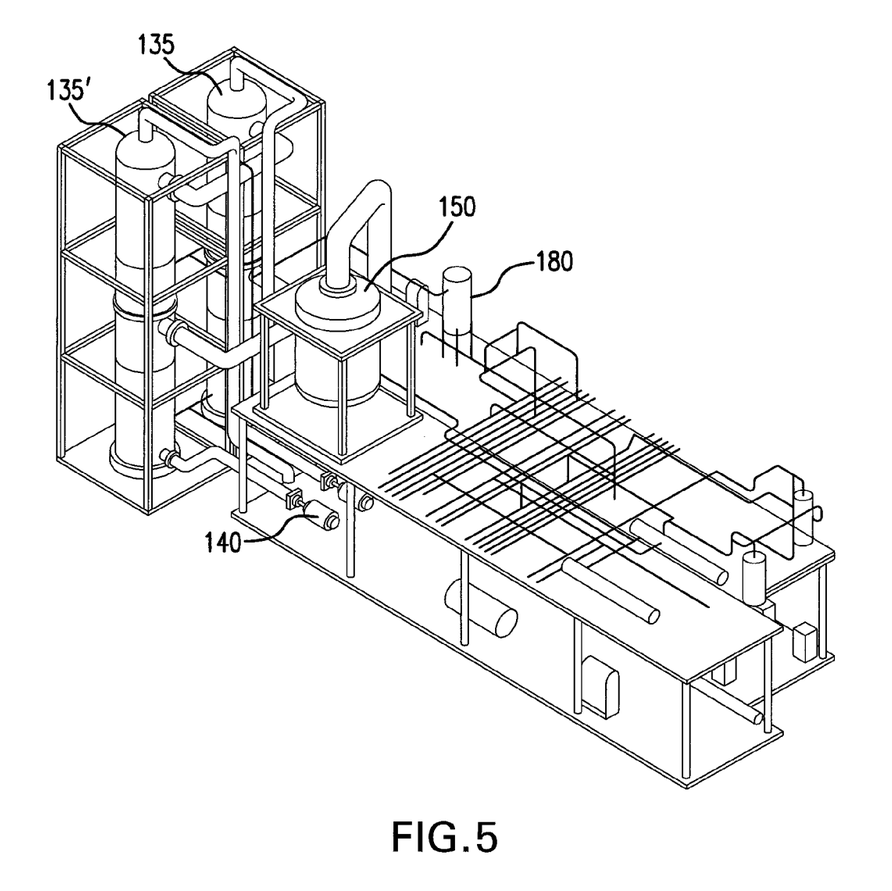
FIG. 5 is a schematic isometric illustration of a modular mobile compact evaporator system of the second embodiment in modules.
Figure 6:
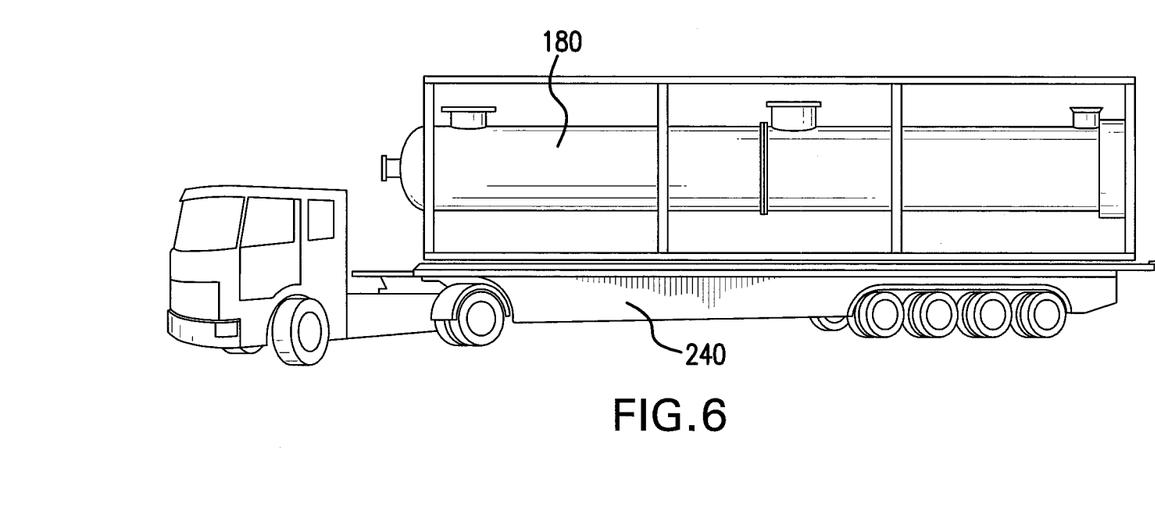
FIG. 6 is a schematic illustration of a single module of a mobile evaporator unit positioned on a truck.

Overall this design will be more easily modularized and transported for small scale SAGD facilities. The use of relatively shorter tubes in the Evaporator Exchanger reduces the height of the exchanger bundle. Together the Evaporator Exchanger and Evaporator Vessel will be a smaller diameter and height than typical evaporator exchanger and sump vessel designs. This will facilitate the construction of a module that can be shipped on its side to a remote site. The other pieces of equipment, including the Evaporator Vapour Compressor, the Distillate Vessel and the Evaporator Mist eliminating Vessel, can be included on other modules with other SAGD system equipment to achieve an optimal modularized layout. FIG. 5 provides the embodiment of FIG. 3 in a modular form. FIG. 6 provides the invention transported on a truck, in particular an exchanger 190 transported on a truck 240.

The current design is based on the design of falling film exchangers. In this case, maximum height is set by the need to not precipitate out solids when evaporating water from the brine in each tube. As the tube gets longer, one need more water per tube to ensure the concentration of dissolved solids (silica and hardness) at the bottom of the tube wouldn't precipitate out. With a given diameter of tube, there is a practical limit where the vapour flow down the tube will cause dry areas and precipitation inside the tubes. We are using the existing design to set the maximum height of a tube. The minimum height of the tube is set by the ability to evenly distribute brine to each of the tubes, the maximum diameter the exchanger can be made, and the transportable diameter that can be transported.

As many changes can be made to the preferred embodiment of the invention without departing from the scope thereof; it is intended that all matter contained herein be considered illustrative of the invention and not in a limiting sense.

We claim:

1. A method for purification of water in a Steam Assisted Gravity Discharge (SAGD) system using a compact evaporator system comprising the steps of:
   a) providing a compact evaporator system comprising a sump including an oil skimming weir, a vertical falling film heat exchanger including tubes, a compressor, having an inlet and an outlet, the compressor outlet being for injecting compressed steam into the heat exchanger, a distillate tank for collecting hot distilled water from the heat exchanger, and a recirculation pump located between the sump and the heat exchanger, wherein the evaporator system receives produced water from the SAGD system into the sump and produces water for feed to a boiler,
   b) introducing a produced water and a make-up water into the sump of the compact evaporator system,
   c) collecting residual water from the falling film heat exchanger into the sump,
   d) pumping the liquid from the sump of the evaporator into a top of a tube side of the falling film heat exchanger,
   e) collecting steam created in the evaporator sump on the tube side of the heat exchanger and routing said steam into a suction drum of the compressor,
   f) compressing the steam from the compressor suction drum and routing said steam to a shell side of the heat exchanger,
   g) collecting the condensed steam from the shell side of the heat exchanger into the distillate tank,
   h) skimming a top layer of a brine comprising oil and other impurities via the weir positioned in the evaporator sump,
   i) transferring the skimmed brine to a brine storage,
   j) using the water from the distillate tank to: i) feed water to the boiler or ii) recycle back to the evaporator sump, wherein the tube has i) a maximum height such that when evaporating water from brine, solids do not substantially precipitate out, ii) a minimum height such that brine is distributed substantially evenly through the tubes, and iii) a maximum height such that the system is transportable.

2. The method of claim 1 further comprising the step of controlling a silica solubility in a circulating liquid.

3. The method of claim 2 wherein the step of controlling silica solubility includes adjusting a pH of the circulating liquid.

4. The method of claim 3 wherein the pH is adjusted by adding at least one chemical solvent to the circulating liquid.

5. The method of claim 1 further comprising controlling a hardness of a circulating liquid.

6. The method of claim 5 wherein the step of controlling the hardness of the circulating liquid includes adjusting a brine blow down rate.

7. The method of claim 1 wherein the heat exchanger is a first heat exchanger and further including:
   providing a second falling film heat exchanger;
   receiving produced water from the SAGD process into the sump of the first heat exchanger which provides water to the boiler; and
   wherein the sump of the first heat exchanger has a lower concentration of impurities than does a sump of the second heat exchanger.

8. The method of claim 7 further including increasing a capacity of the compact evaporator system.

9. The method of claim 7 further including reducing a loading of the compressor of the compact evaporator system.

10. The method of claim 7 including:
    skimming contaminants from the sump of the first heat exchanger,
    transferring the contaminants into the sump of the second heat exchanger,
    maintaining a concentration of impurities in the first heat exchanger lower than a concentration of impurities in the second heat exchanger.

11. A method for purification of water in a Steam Assisted Gravity Discharge (SAGD) system using a compact evaporator system comprising the steps of:
    a) providing a compact evaporator system including two vertical falling film heat exchangers each including tubes and a sump, a compressor for circulating steam into both heat exchangers, a compressor suction drum for protecting the compressor from entrained liquid contamination, a distillate tank for collecting hot distilled water produced from the vapor from the heat exchangers, a recirculation pump for circulating brine from the evaporator sump of each of the heat exchangers back to the heat exchangers, wherein the compact evaporator system receives produced water from the SAGD process and make-up water which are fed into the evaporator sump of the respective heat exchanger for providing water to feed a boiler;

b) introducing a produced water and a make-up water into the sumps of each heat exchanger of the compact evaporator system;

c) collecting residual water from each of the falling film heat exchangers into the respective sump, d) pumping the liquid from the sump of each falling film heat exchanger into a top of a tube side of each of the falling film heat exchangers;

e) collecting steam created in the evaporator sump on the tube side of each heat exchanger and routing said steam into the suction drum;

f) compressing the steam from the suction drum via the compressor and routing said steam to a shell side of each heat exchanger;

g) collecting the condensed steam from the shell side of each heat exchanger into the distillate tank;

h) skimming a top layer of a brine comprising oil and other impurities via a weir positioned in the respective sump of each heat exchanger;

i) transferring the skimmed brine to a brine storage; and j) using the water from the distillate tank to: i) feed water to the boiler or ii) recycle water back to the evaporator sump of the respective heat exchanger, wherein the tube has i) a maximum height such that when evaporating water from brine, solids do not substantially precipitate out, ii) a minimum height such that brine is distributed substantially evenly through the tubes, and iii) a maximum height such that the system is transportable.

12. The method of claim 11 further including transferring contaminants skimmed from the sump of the first evaporator into the sump of the second evaporator.

13. The method of claim 12 further including maintaining a concentration of impurities in the first heat exchanger lower than a concentration of impurities in the second heat exchanger.

14. The method of claim 11 including controlling a silica solubility in a circulating liquid by adjusting a pH thereof.

15. The method of claim 14 further including controlling a hardness of the circulating liquid.

* * * * *